No. 738,064. PATENTED SEPT. 1, 1903.
A. PRINZHORN.
VEHICLE TIRE.
APPLICATION FILED MAY 11, 1903.
NO MODEL.
BEST AVAILABLE COPY
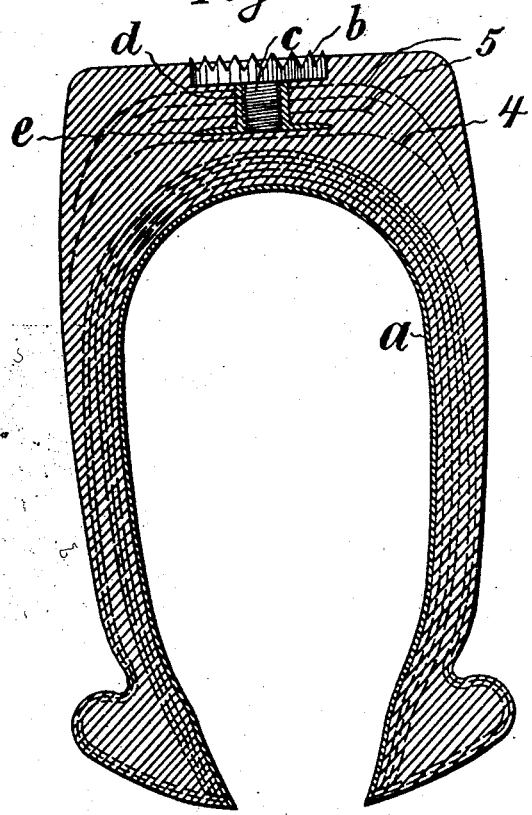
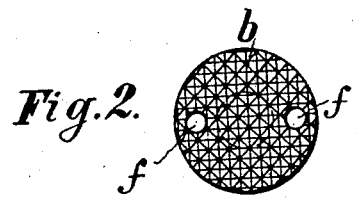

No. 738,064. Patented September 1, 1903.

UNITED STATES PATENT OFFICE.

ADOLF PRINZHORN, OF HANOVER, GERMANY.

VEHICLE-TIRE.

SPECIFICATION forming part of Letters Patent No. 738,064, dated September 1, 1903.

Application filed May 11, 1903. Serial No. 156,658. (No model.)

*To all whom it may concern:*

Be it known that I, ADOLF PRINZHORN, a subject of the German Emperor, residing at Hanover, in the Kingdom of Prussia, German Empire, have invented certain new and useful Improvements in Vehicle-Tires; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to tires, and more particularly to devices for preventing the slipping of the wheels of bicycles, automobiles, and the like to the side on damp or slippery roads.

I have shown the device applied to the outer tube of an automobile-tire, the structure being such as to prevent the antislipping device from being forced into the tire.

Referring to the drawings, in which like parts are similarly designated, Figure 1 is a cross-section of the outer tube of an automobile-tire, and Fig. 2 is a top plan view of the head of the antislipping device.

This device consists of a nut $d$, having preferably a flange $e$ or suitable lateral projections on one end embedded within the tire $a$, supported and more securely held in place between the customary strengthening-strips of fabric 4 5, through some of which, 5, the shank of the nut passes. Into this nut is screwed a large-headed bolt or screw, the head of which is provided with corrugations or points $b$ and the center thereof with a threaded shank $c$, taking into the nut. The screw or bolt is provided with any suitable means to enable it to be screwed home into the nut, and to this end I have shown the bolt provided with two holes $f$ for the pins of a su... e key, Fig. 2. It will be observed that the head is practically countersunk, only the points $b$ on the head of the bolt project but slightly beyond the tread-face of the tire. It will thus be seen that the bolts when worn down can be easily removed and replaced by new ones.

Other modes of securing a changeable tread-bolt to the tire may be used, and the device is applicable to solid-rubber tires as well as pneumatic tires.

Having thus described my invention, what I claim as new therein, and desire to secure by Letters Patent, is—

1. The combination with a tire and a nut held therein; of a screw having an enlarged roughened head slightly projecting beyond the tread of the tire, substantially as described.

2. The combination with a tire; of a flanged nut, strips of fabric in the body of the tire on each side of said flange, a screw having an enlarged roughened head provided with keyways, said screw engaging the nut and partially countersunk in the tire, substantially as described.

In testimony that I claim the foregoing as my invention I have signed my name in presence of two subscribing witnesses.

ADOLF PRINZHORN.

Witnesses:
LEONORE RASCH,
E. G. WHITE.